US007159347B1

(12) United States Patent
Ngan

(10) Patent No.: US 7,159,347 B1
(45) Date of Patent: Jan. 9, 2007

(54) DISPLAY SHEET HOLDER

(76) Inventor: Chi Lung Ngan, 5 Bradford Rd., Edison, NJ (US) 08820

( * ) Notice: Subject to any disclaimer, the term of this patent is extended or adjusted under 35 U.S.C. 154(b) by 193 days.

(21) Appl. No.: 10/992,767

(22) Filed: Nov. 22, 2004

(51) Int. Cl.
*B32B 3/06* (2006.01)

(52) U.S. Cl. ......................... 40/514; 428/36.9; 428/99; 40/617; 40/649; 40/658; 40/904

(58) Field of Classification Search ............... 428/36.9, 428/99; 40/514, 904, 658, 617, 649
See application file for complete search history.

(56) References Cited

U.S. PATENT DOCUMENTS

| | | | | |
|---|---|---|---|---|
| 316,771 A | | 4/1885 | Gerdom | |
| 379,375 A | | 3/1888 | Delano | |
| 557,932 A | | 4/1896 | Yarnall | |
| 600,852 A | | 3/1898 | Baisely | |
| 719,597 A | | 3/1903 | Lee | |
| 867,750 A | | 10/1907 | Pfleghardt | |
| 2,350,236 A | | 5/1944 | Johnson | |
| 2,512,447 A | | 6/1950 | Marie | |
| 2,709,318 A | * | 5/1955 | Benjamin | 446/103 |
| 3,119,977 A | * | 1/1964 | Foote | 338/318 |
| 3,388,493 A | | 6/1968 | Greenwell | |
| 4,393,915 A | | 7/1983 | Olson | |
| 4,525,946 A | | 7/1985 | Olson | |
| 5,927,671 A | | 7/1999 | Pynenburg | |
| 6,038,800 A | * | 3/2000 | Seidel | 40/517 |
| 6,170,182 B1 | | 1/2001 | Skypala | |
| 6,474,009 B1 | | 11/2002 | Hahn | |

* cited by examiner

*Primary Examiner*—Alexander S. Thomas
(74) *Attorney, Agent, or Firm*—Shlesinger, Arkwright & Garvey LLP

(57) ABSTRACT

A one-piece sleeve structure for securing the end of sheet material which permits ease in opening and closing on the sheet material during insertion or removal therefrom. Included are end caps for positive retaining of the sheet once inserted.

6 Claims, 2 Drawing Sheets

DISPLAY SHEET HOLDER

FIELD OF THE INVENTION

This invention relates to devices for holding sheet material for display purposes such as curtains, documents, maps, shades, posters and the like and includes a one-piece sleeve structure having an integrally formed hinge which permits ease in opening and closing the sheet holder during positioning and removal of the sheet material.

BACKGROUND OF THE INVENTION

Display sheet holders has been used for over 100 years as noted by U.S. Pat. No. 316,771 to Gerdom, U.S. Pat. No. 379,375 to Delano, U.S. Pat. No. 557,932 to Yarnall, and U.S. Pat. No. 600,852 to Baisley.

The early patent of Gerdom U.S. Pat. No. 316,771 used brass or spring metal for his sleeve to permit insertion of the web or sheet material. A bar holding the sheet material was slipped into the sleeve which was sprung outwardly to receive the bar and web material with the bar positioned so as to prevent the web from being pulled from the sleeve. Web gripping devices forming a part of the bar or sleeve are shown by Baisley and Yarnall for example.

More recent patents such as Pfleghardt U.S. Pat. No. 867,750, Johnson U.S. Pat. No. 2,350,236, Olson U.S. Pat. No. 4,393,915 and U.S. Pat. No. 4,525,946 and Pynenburg U.S. Pat. No. 5,927,671 show other web type holding and securing devices.

Hahn U.S. Pat. No. 6,474,009 is typical of a clip mechanism for securing the web in a holder as is also Skypala U.S. Pat. No. 6,170,182, Greenwell U.S. Pat. No. 3,388,493, Marie U.S. Pat. No. 2,512,447 and Lee U.S. Pat. No. 719,597.

Baisley mentioned above provides a stop for limiting the depth of insertion of the web or sheet material.

OBJECTS AND SUMMARY OF THE INVENTION

It is an object of this invention to provide a display sheet holder with an integrally formed hinge that can be inexpensively and readily manufactured from sheet material by extrusion including forming, bending and molding.

Still another object of this invention is to provide a one-piece sleeve which is easily opened and closed by means of an integrally formed hinge for ease in insertion of the sheet material for display purposes.

A further object of this invention is to provide a one-piece sleeve for holding sheet material which has an integrally formed hinge with a memory for repositioning of the top and bottom members of the sleeve after opening the sleeve about the hinge so as to affect a sheet hold down position.

Still a further object of this invention is to provide a display sheet holder which has snap caps for the end of the sleeve thereby preventing accidental dislodgement of the caps from the sleeve which would cause release of the material from the sleeve.

In summary, this invention relates to a display sheet holder having an integrally formed hinge which permits ease in opening for insertion of sheet material and which maintains the sheet material in a positive relationship when in closed position.

These and other objects of the invention will be apparent from the following description and the drawings which are as follows:

DETAILED DESCRIPTION OF THE DRAWINGS

FIGS. 1–4

Figure 1:
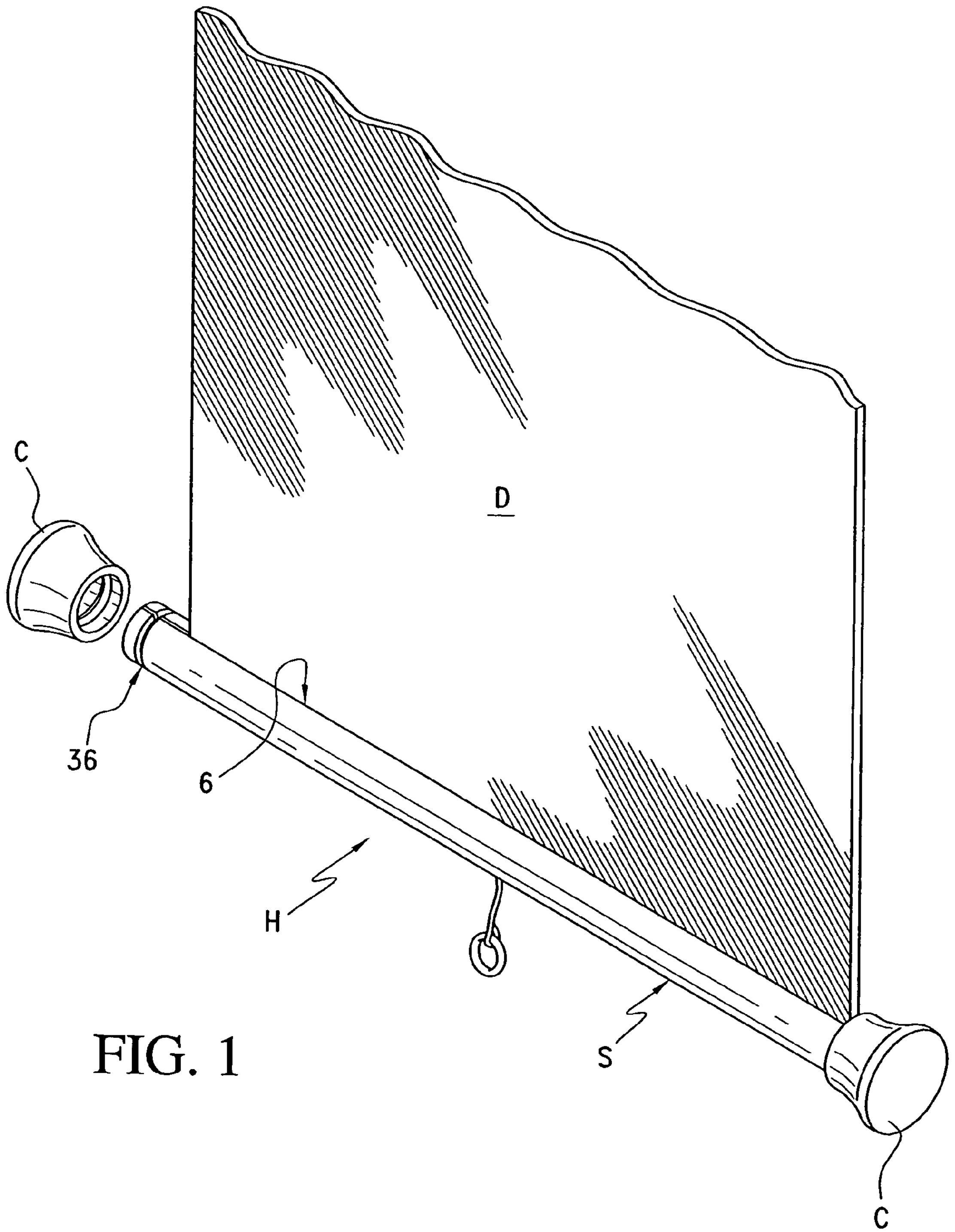
FIG. 1 is a partial perspective view showing one of the caps positioned for mounting on the sleeve with the other cap mounted on the sleeve and showing only a portion of the sheet material inserted in the sleeve.

The display sheet holder H includes an inner surface grooved sleeve S. The sleeve S includes a left end 2 and a right end 4. The sleeve S has a longitudinal slot 6 extending from adjacent the left end of the sleeve 2 to adjacent the right end of the sleeve 4. The sleeve S includes a longitudinal integrally formed hinge 8 extending from the left end of said sleeve 2 to the right end of said sleeve end 4. The hinge 8 permits the sleeve S to be opened and closed along the longitudinal slot 6. The sleeve S has swingable top and bottom segments 10 and 12. The top segment 10 has a free top side 14 and the bottom segment 12 has a bottom free side 16. The top segment 10 has an attached side 18 secured to the hinge 8 and the bottom segment 12 has an attached side 20 secured to the hinge 8. The top segment 10 at the top free side 14 has a flange 22 extending inwardly into said sleeve S and movable with said top segment 10. The bottom segment 12 also has a flange 24 extending inwardly into said sleeve S and movable with the bottom segment 12. The flange 22 has a top surface 26 and the flange 24 as a top surface 28. The flange 24 has a flat bottom surface 30. The flange 22 also is provided with a flat bottom surface 31 similar to the bottom surface 30 of flange 24. Cooperating sheet gripping means 32 and 34 are provided on the top surfaces 26 and 28 of the flanges 22 and 24. The grippers 32 and 34 may be a series of projections on the top surface 26 and a series of recesses on the top surface 28 of the projection and recesses may be alternatively positioned on the flanges 22 and 24 or other gripping means such as ribs and slots may be provided (not shown).

The display sheet holder H may be of various materials which permit the sleeve S to flex about the hinge 8. Certain metals can be struck to form a seam thereby creating a flexible hinge whereas the remaining portion of the sleeve may be rigid. Preferably a semiflexible resin material is preferred permitting a hinge to be heat formed in the plastic permitting flexing of the hinge while the remaining portion of the sleeve will remain semi-rigid. Such a hinge will tend to maintain the segments such as 10 and 12 in closed position until sprung open about the hinge 8.

Figure 3:
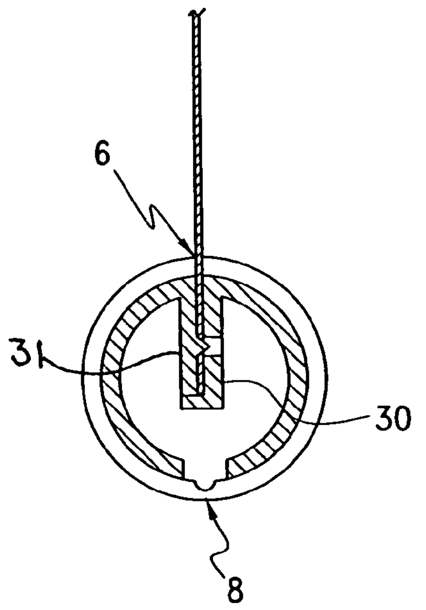
FIG. 3 is a cross section of the sleeve in closed position with the sheet material clamped in the sleeve and showing only the lower portion of the sheet material.
Figure 4:
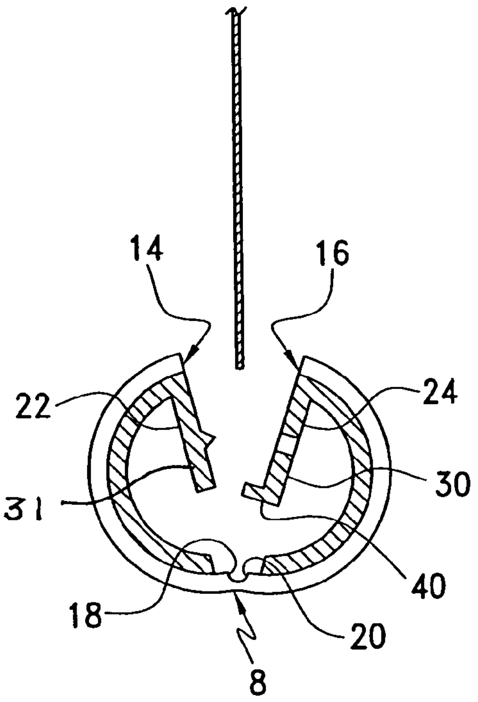
FIG. 4 is a cross section of the sleeve in open position for receiving the sheet material of which only the lower portion is shown.

Caps C are provided which snap-on the ends 2 and 4 of the sleeve S. The ends 2 and 4 of the sleeve S are provided with annular recesses 36 and the caps C are provided with cooperating annular ribs 38 which snap into the recesses 36. Obviously the recesses 36 may be on the caps C and the ribs 38 on the sleeve S. At least one of the flanges 22 and 24 may be provided with a limiting sheet feeding stop such as 40 which limits the depth of insertion of the display sheet D. As will be noted in FIGS. 2, 3, and 4, the stop 40 is a projecting finger or upturned rib or flange which extends up and beyond the end face of the other flange 22.

It is to be noted that the hinge 8 is positioned on the plane of the slot 6 when in closed position. The hinge 8 will at that time be positioned approximately 180° from the slot 6.

Figure 2:
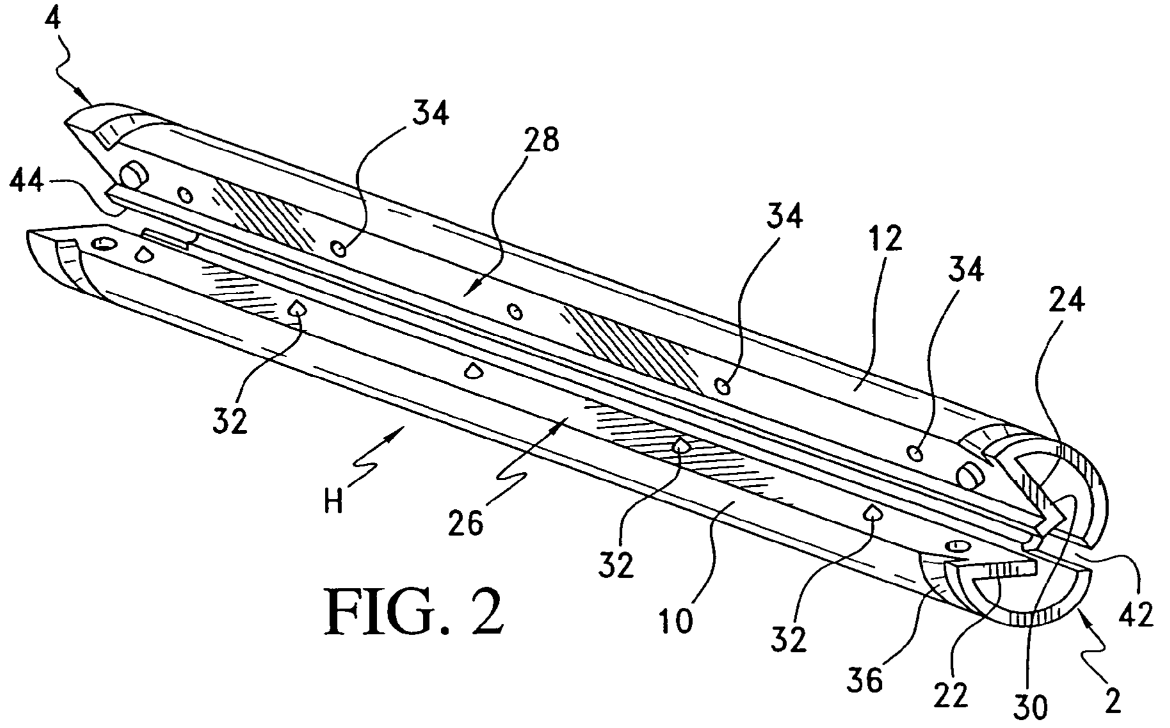
FIG. 2 is a perspective view showing the sleeve in open position.

It is to be noted in FIG. 2 that the hinge 8 ends short of the sleeve S on both left and right ends of the sleeve as at recess slots 42 and 44 which allow for some flex inwardly of the ends 2 and 4 of the sleeve S to permit greater ease in snapping on and removing caps C.

OPERATION

In operation of the holder H, the caps C are removed and the sleeve S is opened at the slot 6 for insertion of the display sheet D. Once the sheet D has been inserted into the slot 6 and against the stop 40, the segments 12 and 14 are closed down on the display sheet D and locked by the gripping means 32 and 34. The caps C are then snapped on to finally secure the sheet D.

While this invention has been described as having a preferred design, it is understood that it is capable of further modifications, and uses adaptions of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A display sheet holder comprising:

a) a one-piece substantially uniform thickness sleeve having inner and outer surfaces and left and right ends;

b) said sleeve having a formed longitudinal hinge extending from adjacent said right end to adjacent said left end;

c) said longitudinal hinge having a groove on inner surface of said sleeve;

d) said groove having a bottom;

e) said hinge having at said groove bottom a thickness substantially less than the substantially uniform thickness of said sleeve;

f) said sleeve having a pair of opposed segments movable about said hinge and integrally formed therewith;

g) said pair of segments each having a first open position and a second closed position and providing a chamber in said second closed position;

h) said segments each having a free end;

i) said pair of segments free ends each having a cooperating abutting flange extending between said left and right ends and a substantial distance vertically into said chamber when said segments are in said second closed position;

j) one of said flanges having a sheet feed stop extending beneath and adjacent to said other side flange;

k) said flanges having recessed and raised integral cooperating sheet gripping means for retaining said sheet between said flanges when said segments are in said second closed position; and l) said display sheet having means for maintaining said sleeve segments in said second closed position.

2. A display sheet holder as in claim 1, wherein:

a) said sheet gripping means includes a series of projections and a cooperating series of projection receiving recesses.

3. A display sheet holder as in claim 1, wherein:

a) said integral formed hinge has memory and returns top and bottom segments closed after opening thereof.

4. A display sheet holder as in claim 1, wherein:

a) said sleeve is of a semi flexible plastic material.

5. A display sheet holder as in claim 1, and wherein:

a) said sleeve is slotted up to adjacent said hinge from said left and right ends to provide inward flex to said left and right ends when said means for maintaining said sleeve in closed position is applied.

6. A display sheet holder as in claim 1, and wherein:

a) said hinge is positioned directly beneath said flanges.

* * * * *